(12) United States Patent
Minohata et al.

(10) Patent No.: US 10,643,830 B2
(45) Date of Patent: May 5, 2020

(54) SPECIFIC SUBSTANCE MONITORING SYSTEM USING MASS SPECTROMETER

(71) Applicants: SHIMADZU CORPORATION, Kyoto-shi, Kyoto (JP); NATIONAL INSTITUTE FOR ENVIRONMENTAL STUDIES, Tsukuba-shi, Ibaraki (JP)

(72) Inventors: Toshikazu Minohata, Kyoto (JP); Shoji Nakayama, Tsukuba (JP)

(73) Assignees: SHIMADZU CORPORATION, Kyoto-shi, Kyoto (JP); National Institute for Environmental Studies, Tsukuba-shi, Ibaraki (JP)

( * ) Notice: Subject to any disclaimer, the term of this patent is extended or adjusted under 35 U.S.C. 154(b) by 0 days.

(21) Appl. No.: 16/158,922

(22) Filed: Oct. 12, 2018

(65) Prior Publication Data

US 2019/0115197 A1 Apr. 18, 2019

(30) Foreign Application Priority Data

Oct. 13, 2017 (JP) ................................ 2017-199640

(51) Int. Cl.
*G01N 30/72* (2006.01)
*G01N 30/88* (2006.01)
(Continued)

(52) U.S. Cl.
CPC .......... *H01J 49/0036* (2013.01); *G01N 30/72* (2013.01); *G01N 30/7206* (2013.01);
(Continued)

(58) Field of Classification Search
CPC .. G01N 2030/027; G01N 30/20; G01N 30/88; G01N 2030/8804; G01N 27/622;
(Continued)

(56) References Cited

U.S. PATENT DOCUMENTS 5,738,783 A * 4/1998 Shirota .................. G01N 30/08
210/198.2
9,281,174 B2 * 3/2016 Takats ................ G01N 30/7253
(Continued)

FOREIGN PATENT DOCUMENTS

| JP | 2014-044175 A | 3/2014 |
| WO | 2014/155530 A1 | 10/2014 |
| WO | 2017/130430 A1 | 8/2017 |

OTHER PUBLICATIONS

Communication dated Mar. 20, 2019, from the European Patent Office in counterpart European Application No. 18199967.3.

*Primary Examiner* — David A Vanore
(74) *Attorney, Agent, or Firm* — Sughrue Mion, PLLC

(57) ABSTRACT

A sample introduction unit 2 regularly collects a sample from a sample passage 1. A measurement unit 3 performs an LC/MS analysis for the collected sample. A spectrum matching judgment section 42 performs image recognition referring to mass spectra in a normal condition accumulated in a normal spectrum database 44, to determine whether a measured mass spectrum is in a normal condition. If the mass spectrum is non-normal, an abnormal peak locator 45 locates a peak which should not be detected in the normal condition, and an $MS^n$ analysis with the located peak selected as the target is performed in the measurement unit 3 under an $MS^n$ analysis execution commander 46. An identification processor 47 performs substance identification by a library search based on an acquired $MS^n$ spectrum. Upon successful identification, an alert commander 49 issues an alert. Thus, the system can automatically monitor hazardous substances with high accuracy.

9 Claims, 4 Drawing Sheets

US 10,643,830 B2
Page 2

(51) Int. Cl.
*H01J 49/00* (2006.01)
*G01N 30/86* (2006.01)

(52) U.S. Cl.
CPC ......... *G01N 30/7233* (2013.01); *G01N 30/86* (2013.01); *G01N 30/88* (2013.01); *H01J 49/004* (2013.01)

(58) Field of Classification Search
CPC ........ G01N 30/04; G01N 30/72; G01N 35/00; G01N 35/1095; H01J 49/0431; H01J 49/004
USPC ........... 250/288, 428; 210/198.2, 502.1, 635, 210/656
See application file for complete search history.

(56) References Cited

U.S. PATENT DOCUMENTS

| | | | |
|---|---|---|---|
| 2006/0169889 A1* | 8/2006 | Yokosuka | H01J 49/0031 250/288 |
| 2013/0309122 A1* | 11/2013 | Mochizuki | C22C 38/002 419/33 |
| 2015/0066387 A1 | 3/2015 | Yamada et al. | |
| 2015/0276773 A1* | 10/2015 | Aoki | G01N 35/0092 700/90 |
| 2015/0308986 A1* | 10/2015 | Ito | G01N 30/20 435/29 |
| 2016/0042929 A1* | 2/2016 | Ogura | H01J 49/0045 250/288 |
| 2017/0146500 A1* | 5/2017 | Kanazawa | G01N 30/88 |
| 2019/0004016 A1* | 1/2019 | Matsumoto | G01N 30/04 |
| 2019/0115197 A1* | 4/2019 | Minohata | G01N 30/7206 |

* cited by examiner

SPECIFIC SUBSTANCE MONITORING SYSTEM USING MASS SPECTROMETER

TECHNICAL FIELD

The present invention relates to a system for monitoring a specific substance to be monitored which may be contained in various samples, such as a river water, industrial effluent, tap water or ambient air, using a mass spectrometer. In particular, the present invention relates to a specific substance monitoring system suitable for regularly or constantly monitoring a sample to determine whether or not a hazardous substance is contained in the sample.

BACKGROUND ART

In Japan, the concentrations of hazardous substances which are potentially harmful to human health and may be contained in drainage water from factories or other sources are controlled under the Water Pollution Prevention Act. The concentrations of chemical substances contained in tap water are controlled under related regulations, such as the water quality criteria based on the Water Supply Act. Many other countries also have their own laws and regulations for controlling such chemical substances, although the kinds of substances to be controlled and criteria to be applied vary from one country to another. In order to determine whether or not those various regulations are properly met, it has been required to regularly conduct a test for hazardous substances in industrial effluent, environmental water (e.g. river water) or tap water.

According to the current practice, a water quality test for environmental water (e.g. river water) or industrial effluent is normally performed as follows: A person in charge of the test regularly visits the site (investigation site) and collects a sample of water. The sample is brought back to a research facility or the like, where the sample is initially subjected to a pretreatment for an analysis and is subsequently analyzed with an analyzing device. Examples of the commonly used analyzing devices include: a liquid chromatograph (LC), gas chromatograph (GC) as well as LC-MS and GC-MS in which a mass analyzer is used as the detector for LC or GC (see Patent Literature 1 or other documents). In the case where an LC-MS or GC-MS is used, a process for identifying a substance in a sample using a mass spectrum acquired by mass spectrometry is normally performed.

However, with the previously described conventional method, it is not easy to increase the frequency of the test, and it is difficult to deal with a sudden occurrence of the mixing of a hazardous substance. Therefore, a hazardous substance may be missed in the detection or the countermeasure may become too late due to a delayed detection.

Additionally, environmental water (e.g. river water) normally contains a wide variety of compounds other than the hazardous substances. Those compounds cannot be completely separated from the hazardous substances even with an LC or GC. Therefore, ion peaks originating from a plurality of compounds will be observed on a mass spectrum. An operator needs to perform the task of locating a peak originating from a hazardous substance from among a large number of peaks observed on the mass spectrum. Such a task is not only extremely cumbersome, but may also cause overlooking of the hazardous substance.

CITATION LIST

Patent Literature

Patent Literature 1: JP 2014-44175 A
Patent Literature 2: WO 2014/155530 A

SUMMARY OF INVENTION

Technical Problem

The present invention has been developed to solve the previously described problem. Its primary objective is to provide a specific substance monitoring system which can prevent an omission of or delay in the detection of a hazardous substance to be monitored, without placing an additional burden on the operator.

Solution to Problem

The present invention developed for solving the previously described problem is a specific substance monitoring system for monitoring a specific substance which is possibly contained in a sample, using a mass spectrometer capable of an $MS^n$ analysis, where n is an integer equal to or greater than two, the system including:

a) a sample collector for repeatedly collecting, at a predetermined timing, a sample to be subjected to a measurement;

b) a mass spectrometry execution controller for performing a mass spectrometric analysis by the mass spectrometer for the sample collected by the sample collector, to acquire a mass spectrum for the sample;

c) a mass spectrum judgment section for determining whether or not the mass spectrum acquired under the control of the mass spectrometry execution controller is in a normal condition, using a database created based on mass spectra acquired by performing a mass spectrometric analysis on each of a plurality of samples in the normal condition which are samples that do not contain the specific substance;

d) an abnormal peak locator for locating, in a mass spectrum which is judged to be in a non-normal condition by the mass spectrum judgment section, a peak which constitutes the cause of the judgment;

e) an $MS^n$ analysis execution controller for performing an $MS^n$ analysis by the mass spectrometer for the sample collected with the sample collector, to acquire an $MS^n$ spectrum, where an ion corresponding to the peak located by the abnormal peak locator is selected as the target in the $MS^n$ analysis; and f) a substance identifier for attempting to identify a substance corresponding to the located peak by performing a library search using the $MS^n$ spectrum acquired under the control of the $MS^n$ analysis execution controller.

In the specific substance monitoring system according to the present invention, the mass spectrometer capable of an $MS^n$ analysis is, for example, a tandem quadrupole mass spectrometer, quadrupole time-of-flight mass spectrometer (so-called Q-TOF mass spectrometer), ion trap mass spectrometer, ion trap time-of-flight mass spectrometer, or TOF/TOF mass spectrometer.

The mass spectrometer may be any of the aforementioned types of mass spectrometers in a solely used form. It is also possible to use a liquid chromatograph mass spectrometer (LC-MS) or gas chromatograph mass spectrometer (GC-MS) in which a liquid chromatograph (LC) or gas chromatograph (GC) is connected in the previous stage of the mass spectrometer. In the case where the substances in a sample are temporally separated from each other by an LC or GC, a mass spectrum can be acquired for each retention time in the mass spectrometer. Accordingly, in this case, the mass spectrum judgment section may preferably determine whether or not the target mass spectrum is in the normal condition, based on a mass spectrum having the same retention time in the database or mass spectra included in a predetermined retention-time range which allows for a shift of the retention time.

In the specific substance monitoring system according to the present invention, the sample collector repeatedly collects the sample to be monitored, at a predetermined timing. This sampling may be performed regularly or irregularly. The sample collector may be configured to collect the sample in response to an instruction or operation by an operator. However, it may preferably be configured to automatically collect a sample at specified intervals of time or at specified points in time. This prevents an omission of the testing due to an operator forgetting to give the instruction or perform the operation. The burden on the operator related to the sample-collecting task is also reduced.

There are various possible forms of the sample, such as a gas sample, liquid sample or solid sample. Therefore, the configuration of the sample collector can be adapted for the form of the sample. For example, for a fluid sample, such as a gas sample or liquid sample, the sample collector may be provided with a passage into which the sample is to be introduced by a pressure difference, level difference or similar mechanism, and a valve for allowing the sample introduced into the passage to pass through for a specific period of time.

When a sample has been collected at a certain timing, the mass spectrometry execution controller performs a mass spectrometric analysis in a normal mode (i.e. without dissociation of an ion) for the sample by the mass spectrometer and acquires a mass spectrum.

The mass spectrum judgment section determines whether or not the mass spectrum acquired at the time is in a normal condition, using a database created beforehand based on mass spectra acquired by performing a mass spectrometric analysis on each of a plurality of samples which do not contain the specific substance. The algorithm for the judgment in the mass spectrum judgment section is not specifically limited. For example, as in a conventionally and commonly used method for a database search or library search, the degree of similarity may be calculated from the degree of matching of the mass-to-charge-ratio values or signal intensity values (relative intensity values) and compared with a threshold for the judgment. More preferably, image recognition techniques, which have been used in recent years for the recognition of an abnormal event based on videos taken with a monitoring camera or for other purposes, may be used to determine whether or not the target mass spectrum is in the normal condition. In particular, an image recognition technique employing artificial intelligence (AI) may be used to judge the matching of the pattern of mass spectra.

If a mass spectrum has been judged to be in a non-normal condition, the abnormal peak locator locates one or more peaks which have constituted the cause of the judgment that the mass spectrum is in a non-normal condition. This peak may possibly be a peak originating from a substance which is not contained in the sample in the normal condition. However, it is difficult to identify the substance from the mass-to-charge ratio of this peak. Accordingly, the $MS^n$ analysis execution controller operates the mass spectrometer to perform an $MS^n$ analysis in which the mass-to-charge ratio corresponding to the located peak is selected as the target, and acquire an $MS^n$ spectrum.

After the $MS^n$ spectrum has been determined, the substance identifier attempts to identify the substance by a library search using the $MS^n$ spectrum. In the library to be used for the library search, standard $MS^n$ spectra for specific substances to be monitored should be registered beforehand. If a substance has been identified by the library search in the substance identifier, the unknown substance contained in the sample at the time is the specific substance to be monitored. If no substance has been successfully identified in the substance identifier, the unknown substance contained in the sample at the time is not the specific substance to be monitored. The specific substance monitoring system according to the present invention may preferably provide the result of the substance identification on a display unit or through other types of output devices to inform a monitoring operator (user) of the result.

The specific substance monitoring system according to the present invention is particularly useful as a system for monitoring a hazardous substance contained in a sample. In that case, the system may preferably be configured as follows: the substance identifier is configured to perform a library search using a hazardous substance library in which an $MS^n$ spectrum for a hazardous substance is registered beforehand, and the system includes an alerting section for issuing an alert when a substance is identified by the library search.

In the specific substance monitoring system according to the present invention, an $MS^2$ spectrum. i.e. the $MS^n$ spectrum with n=2, may be solely used for the substance identification. However, it is preferable to use both $MS^2$ and $MS^3$ spectra.

Thus, in a preferable mode of the specific substance monitoring system according to the present invention, the $MS^n$ analysis execution controller is configured to operate the mass spectrometer to perform an $MS^2$ analysis and an $MS^3$ analysis for a sample collected with the sample collector, and acquire an $MS^2$ spectrum and an $MS^3$ spectrum, and the substance identifier is configured to attempt to identify a substance by performing a library search using the $MS^2$ spectrum and the $MS^3$ spectrum acquired under the control of the $MS^n$ analysis execution controller.

In the $MS^3$ analysis for acquiring an $MS^3$ spectrum, for example, a peak having the highest signal intensity among the peaks observed in the $MS^2$ spectrum can be selected as the target.

The use of both $MS^2$ and $MS^3$ spectra for the substance identification makes it possible to distinguish between substances in their $MS^3$ spectra even if those substances are similar in chemical structure and are difficult to distinguish in their $MS^2$ spectra. Therefore, for example, when a plurality of substances contained in a sample cannot be sufficiently separated from each other by an LC or GC, or when a sample containing a plurality of substances is directly introduced into the mass spectrometer for mass spectrometry without using an LC or GC, the substance can be identified with high accuracy or can be identified as a substance which is not present in the library.

In the image recognition technique using artificial intelligence mentioned earlier, it is easy to perform the machine learning, and particularly, deep learning. Repeating the learning of the image patterns of mass spectra which have been judged to be normal enriches the database and improves the correctness of the judgment.

Thus, in a preferable mode of the specific substance monitoring system according to the present invention, the mass spectrum judgment section includes a database updater for updating information in the database using a mass spectrum judged to be in the normal condition.

As noted earlier, when no substance has been identified in the substance identifier and the unknown substance contained in the sample concerned has been judged to be none of the specific substances to be monitored, the original mass spectrum obtained by the measurement is considered to be in the normal condition.

Accordingly, in the specific substance monitoring system according to the present invention, the database updater may preferably be configured so that, if a substance is not successfully identified by the substance identifier, the database updater updates the database so that the mass spectrum on which a peak originating from the unidentified substance is observed is registered as a mass spectrum in the normal condition.

According to this configuration, if a mass spectrum for a sample has been judged to be in a non-normal condition because a substance which was not detected in the past has been found in the sample, and if that substance is not a specific substance, such as a hazardous substance, a mass spectrum for a sample containing the same substance will be judged to be in the normal condition in the subsequent measurements. In this manner, the correctness of the database can be progressively improved by machine learning so that a mass spectrum for a sample containing a specific substance will be judged as correctly as possible.

In the case of using an LC-MS or GC-MS as the mass spectrometer, the $MS^n$ analysis may be immediately performed after a normal mode of mass spectrometry, as in the auto-$MS^2$ function described in Patent Literature 2 or other documents. Alternatively, the $MS^n$ analysis may be performed in the second or subsequent LC/MS or GC/MS analysis for the same sample after the LC/MS or GC/MS analysis for the first injection of that sample has been completed. In the latter case, in order to allow for the second or subsequent LC/MS or GC/MS analysis for the same sample as used in the first analysis, the sample collector may preferably be configured to simultaneously collect the sample in sufficient quantity for performing the analysis multiple times and divide the sample into fractions to be individually used for the LC/MS or GC/MS analysis.

By performing the $MS^n$ analysis immediately (in real time) after the normal mode of mass spectrometry in the previously described manner, the system can promptly determine, for example, whether or not a hazardous substance is contained in a sample collected from tap water, and issue an alert as soon as the presence of a hazardous substance has been confirmed. Accordingly, for example, an urgent countermeasure, such as discontinuing the supply of the tap water, can be promptly taken.

In one mode of the specific substance monitoring system according to the present invention, the sample to be subjected to the measurement is a liquid sample, the mass spectrometer is a liquid chromatograph mass spectrometer, and the sample collector includes:
  a sample container including a storage portion in which an inlet passage and an outlet passage for a liquid sample are provided, and a portion of the wall of the sample container is sealed with a septum;
  a sample suction-ejection unit including a needle, for suctioning and ejecting a liquid sample through the needle:
    a sample injection port for injecting a sample into a liquid chromatograph unit;
  a driver for making the needle move between a position at which the needle penetrates the septum of the sample container and the sample injection port; and
  a controller for controlling operations of the driver and the sample suction-ejection unit so as to make the needle move to the position at which the needle penetrates the septum of the sample container and suction a liquid sample contained in the storage portion of the sample container, and subsequently make the needle move to the sample injection port and eject the liquid sample into the sample injection port.

In this mode of the system, the liquid sample is passed through the passage formed by the inlet passage, storage portion, and outlet passage of the sample container, to fill the storage portion with the liquid sample. Then, at a predetermined timing, the needle is penetrated through the septum, and a portion of the liquid sample stored in the storage portion at that point in time is suctioned by the sample suction-ejection unit. Subsequently, the suctioned liquid sample is ejected into the sample injection port, whereby the liquid sample is injected into the liquid chromatograph unit. With this configuration, for example, a portion of the liquid sample continuously flowing through a pipe can be collected at a desired timing and subjected to an analysis.

The previous mode of the present invention, the system may preferably be configured as follows:
  the sample collector further includes a preparative separation sample container for temporarily storing a liquid sample:
  the driver is capable of making the needle move between the position at which the needle penetrates the septum of the sample container, the sample injection port, and the preparative separation sample container; and
  the controller controls operations of the driver and the sample suction-ejection unit so as to (i) make the needle move to the position at which the needle penetrates the septum of the sample container and suction a liquid sample contained in the storage portion of the sample container, and subsequently make the needle move to the preparative separation liquid container and eject the liquid sample into the preparative separation liquid container, as well as (ii) make the needle move to the preparative separation liquid container and suction the liquid sample stored in the preparative separation liquid container, and subsequently make the needle move to the sample injection port and eject the liquid sample into the sample injection port.

According to this configuration, the liquid sample suctioned from the sample container can be temporarily stored in the preparative separation sample container and injected into the liquid chromatograph unit at a later, appropriate point in time, rather than being injected into the liquid chromatograph unit immediately after the suction. Therefore, if multiple preparative separation sample containers are prepared, it is possible to collect the liquid sample at shorter intervals of time than the period of time required for one sequential analysis in the liquid chromatograph mass spectrometer, and perform a batch analysis on the collected samples at a later point in time.

Advantageous Effects of Invention

With the specific substance monitoring system using a mass spectrometer according to the present invention, it is possible to quickly and assuredly detect a substance which should not be contained in a sample in a normal condition, as well as quickly and automatically determine whether or not that substance is the specific substance to be monitored. Accordingly, whether or not a hazardous substance is contained in tap water, environmental water, ambient air or other types of samples can be checked with high frequency without placing an excessive burden on operators.

DESCRIPTION OF EMBODIMENTS

A hazardous substance monitoring system as one embodiment of the specific substance monitoring system according to the present invention is hereinafter described with reference to the attached drawings.

Figure 1:
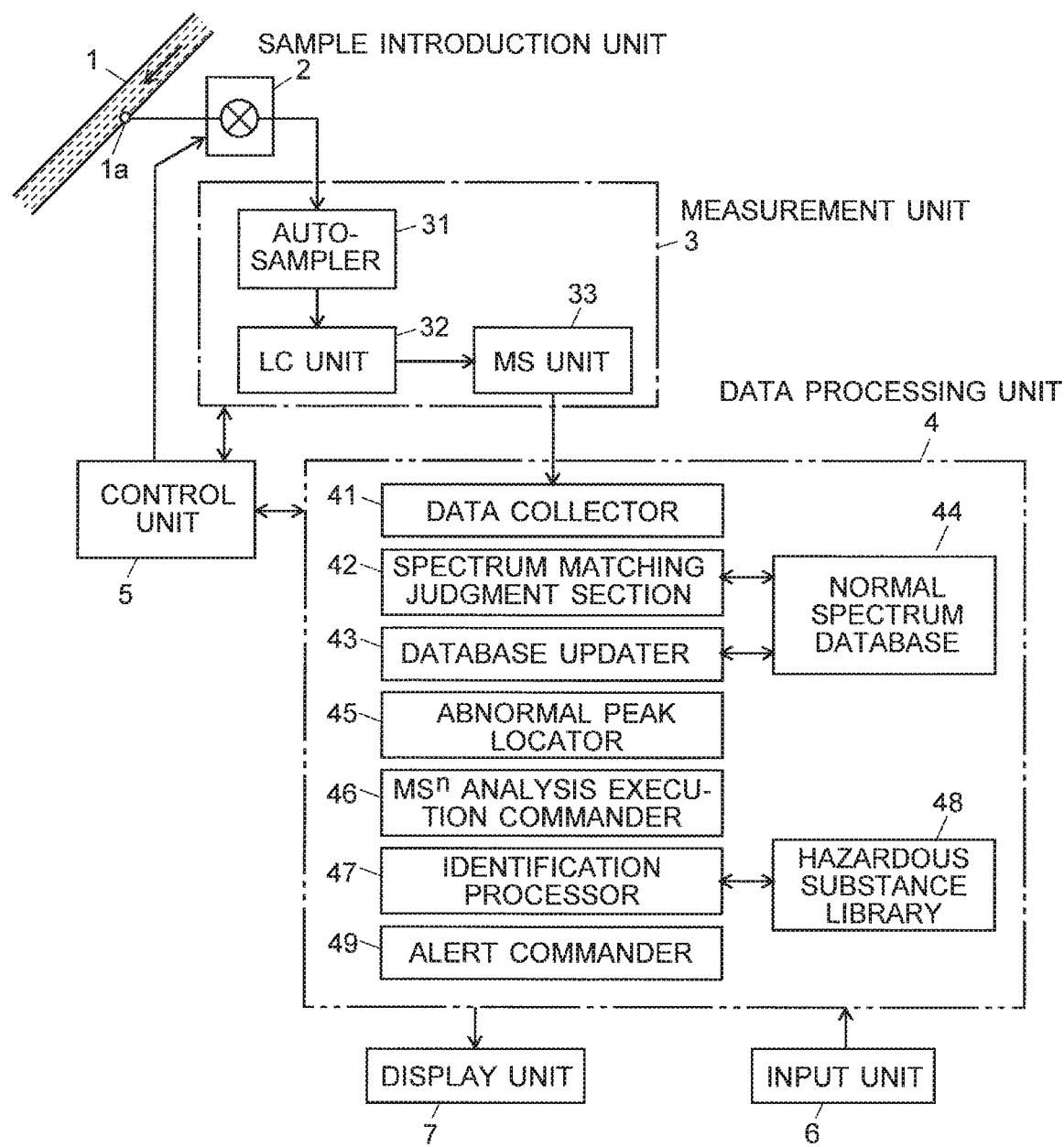
FIG. 1 is a schematic configuration diagram of a hazardous substance monitoring system as one embodiment of the specific substance monitoring system according to the present invention.

FIG. 1 is a schematic configuration diagram of the hazardous substance monitoring system according to the present embodiment. This hazardous substance monitoring system is a system for regularly checking whether or not a hazardous substance (e.g. a legally controlled substance) is contained in a river water, industrial effluent, tap water or the like, as well as identifying the substance and issuing an alert if such a hazardous substance has been detected.

The hazardous substance monitoring system according to the present embodiment includes: a sample introduction unit 2 for introducing a sample from a collection port 1a of a sample passage 1 through which a flow of water (or a different kind of fluid) to be monitored is passed; a measurement unit 3 for performing a measurement on a portion of the introduced sample; a data processing unit 4 for analyzing and processing data obtained with the measurement unit 3; a control unit 5 for controlling the operations of the sample introduction unit 2, measurement unit 3 and data processing unit 4; as well as an input unit 6 and a display unit 7 serving as the user interface.

The sample introduction unit 2 includes a valve which opens and closes, for example, according to a command from the control unit 5. While the valve is in the open state, the sample is introduced from the collection port 1a through the valve into the measurement unit 3.

The measurement unit 3, which is an LC-MS, includes an autosampler 31, a liquid chromatograph (LC) unit 32, and a mass spectrometer (MS) unit 33 capable of an $MS^n$ analysis. Though not shown, the LC unit 32 includes a liquid supply pump for supplying a mobile phase at a fixed flow rate, an injector for injecting a sample into the mobile phase being supplied, a column for temporally separating the compounds in the sample, and other elements. The MS unit 33 is, for example, an ion trap time-of-flight mass spectrometer including an electrospray ion source. The autosampler 31 holds a predetermined amount of sample supplied from the sample introduction unit 2 and gives it to the injector in the LC unit 32.

The data processing unit 4 includes a data collector 41, spectrum matching judgment section 42, database (DB) updater 43, normal spectrum database 44, abnormal peak locator 45, $MS^n$ analysis execution commander 46, identification processor 47, hazardous substance library 48 and alert commander 49 as its functional blocks for carrying out characteristic processing as will be described later. The actual form of the data processing unit 4 is normally a personal computer or a more sophisticated workstation. The functional blocks in the data processing unit 4 can be embodied by executing, on such a computer, a dedicated data-processing software program installed on the same computer.

Figure 4:
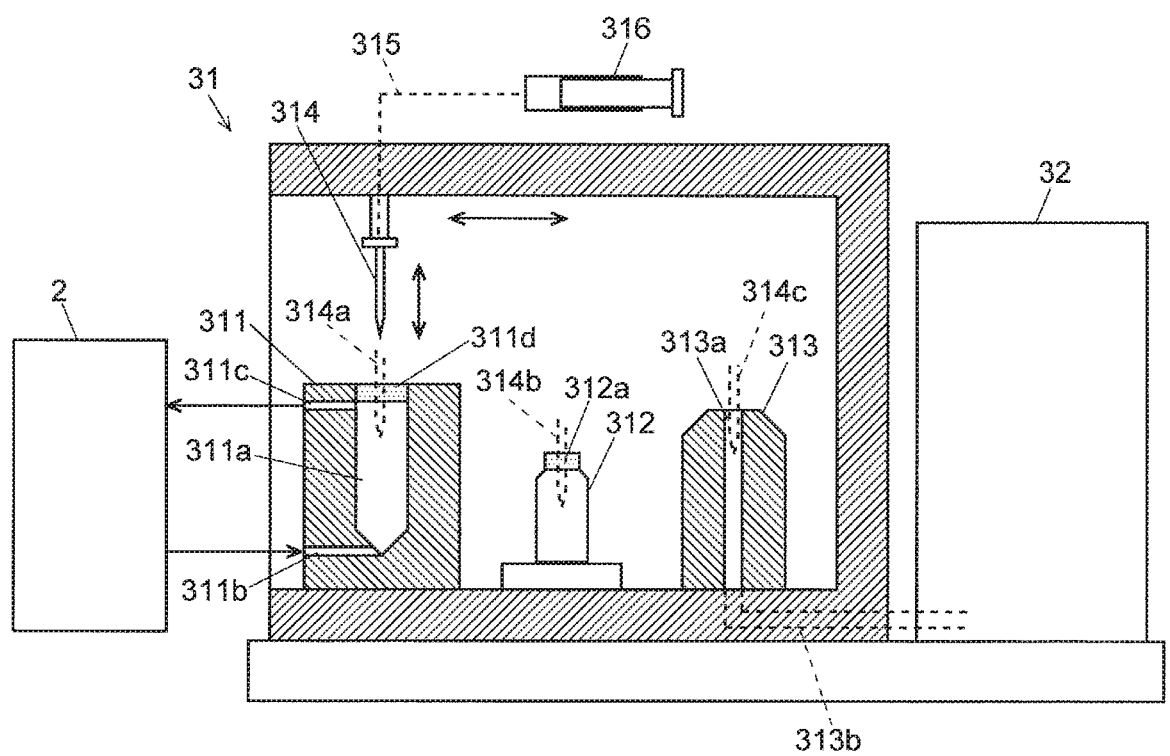
FIG. 4 is a schematic configuration diagram showing one example of an autosampler in the hazardous substance monitoring system according to the present embodiment.

An example of the specific configuration of the autosampler 31 is hereinafter described with reference to FIG. 4.

The autosampler 31 includes a sample flow container 311, preparative separation container 312, sample injection port 313, needle 314, and syringe pump 316 connected to the needle 314 via a passage 315. Though not shown, a drive mechanism for vertically driving the needle 314 within a predetermined range and another drive mechanism for driving the needle 314 in a horizontal plane (e.g. in the two axial directions which are orthogonal to each other) are also provided. The sample flow container 311 has a storage portion 311a for holding a sample, an inlet passage 311b and an outlet passage 311c both of which communicate with the storage portion 311a, as well as a septum 311d attached to an opening in the upper wall of the sample flow container 311 to seal the storage portion 311a. The preparative separation container 312 also has a septum 312a attached to its opening to seal the inner space of the container. Although FIG. 4 shows only one preparative separation container 312, two or more preparative separation containers 312 may be prepared.

An operation for introducing a sample into the LC unit 32 in the autosampler 31 is hereinafter described.

In the process of collecting a sample, a flow of the sample is passed from the sample introduction unit 2 through the inlet passage 311b, storage portion 311a and outlet passage 311c to fill the storage portion 311a with the sample. Subsequently, the needle 314 located at a position above the sample flow container 311 is lowered to the position indicated by the broken line 314a in FIG. 4 to make the needle 314 penetrate the septum 311d. Then, the syringe pump 316 is operated to suction a predetermined amount of sample from the storage portion 311a. After the suctioning has been completed, the needle 314 is pulled up to a predetermined position. Subsequently, under the control of the control unit 5, the sample can be injected into the LC unit 32 in either a direct injection mode or preparative separation injection mode.

[Direct Injection Mode]

In the direct injection mode, the needle 314 into which the sample has been suctioned by the syringe pump 316 is transferred to a position above the sample injection port 313. Then, the needle 314 is lowered to the position indicated by the broken line 314c in FIG. 4 to insert the needle 314 into the injection opening 313a of the sample injection port 313. Subsequently, the syringe pump 316 is operated to eject the sample through the passage 315 and the needle 314. The ejected sample is introduced through the passage 313b into the LC unit 32.

[Preparative Separation Injection Mode]

In the preparative separation injection mode, the needle 314 into which the sample has been suctioned by the syringe pump 316 is transferred to a position above the preparative separation container 312. Then, the needle 314 is lowered to the position indicated by the broken line 314b in FIG. 4 to make the needle 314 penetrate the septum 312a of the preparative separation container 312. The syringe pump 316 is operated to eject the sample through the passage 315 and the needle 314. Thus, the sample is temporarily stored in the preparative separation container 312. At a later, predetermined timing, the sample stored in the preparative separation container 312 is suctioned through the needle 314 and ejected into the injection opening 313a of the sample injection port 313, whereby the sample is introduced into the LC unit 32. While the measurement in the measurement unit 3 requires a predetermined period of time, the sample can be sequentially collected into multiple preparative separation containers 312. Thus, the sample can be collected at shorter intervals of time than the period of time required for the measurement.

Figure 2:
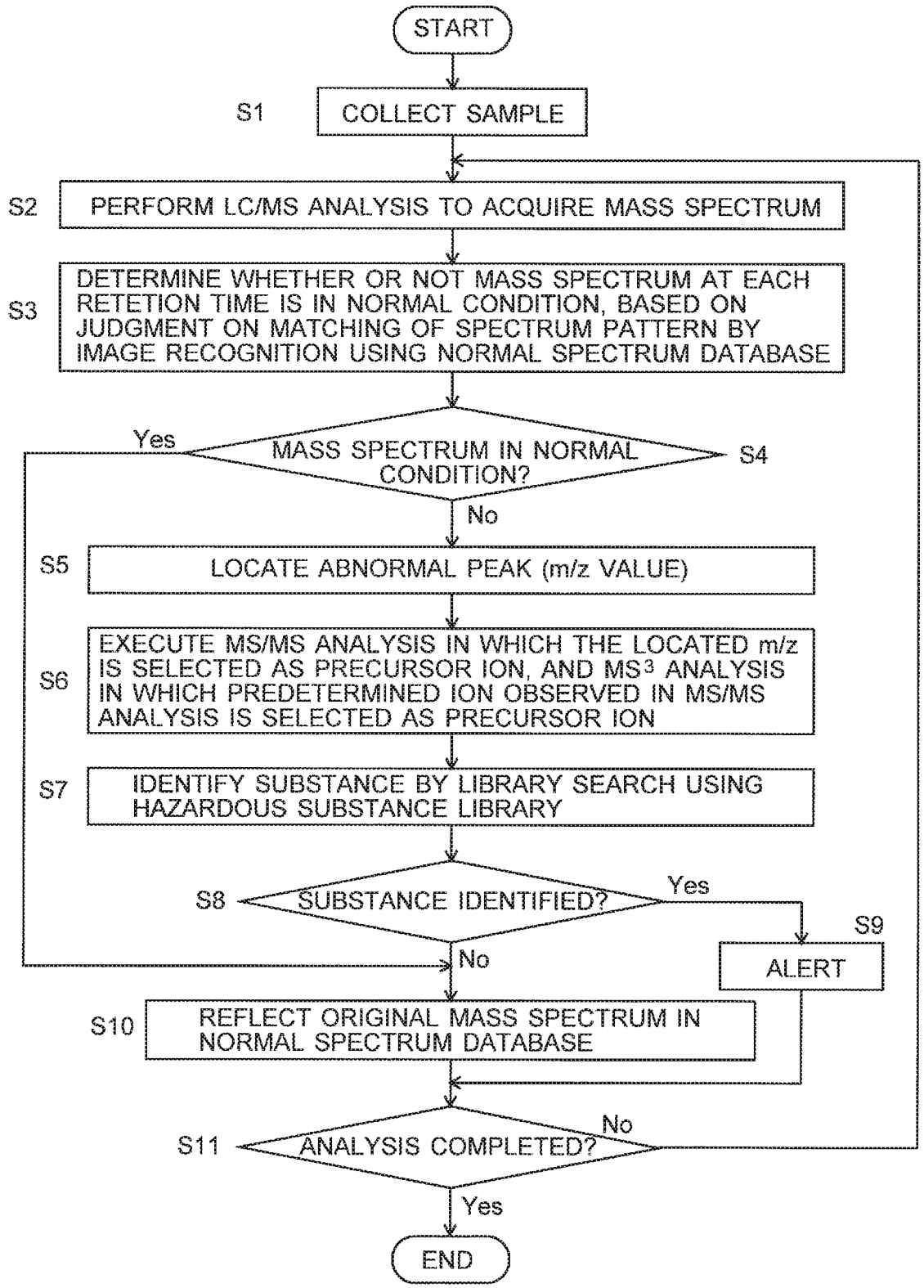
FIG. 2 is a flowchart of a hazardous substance monitoring process in the hazardous substance monitoring system according to the present embodiment.
Figure 3:
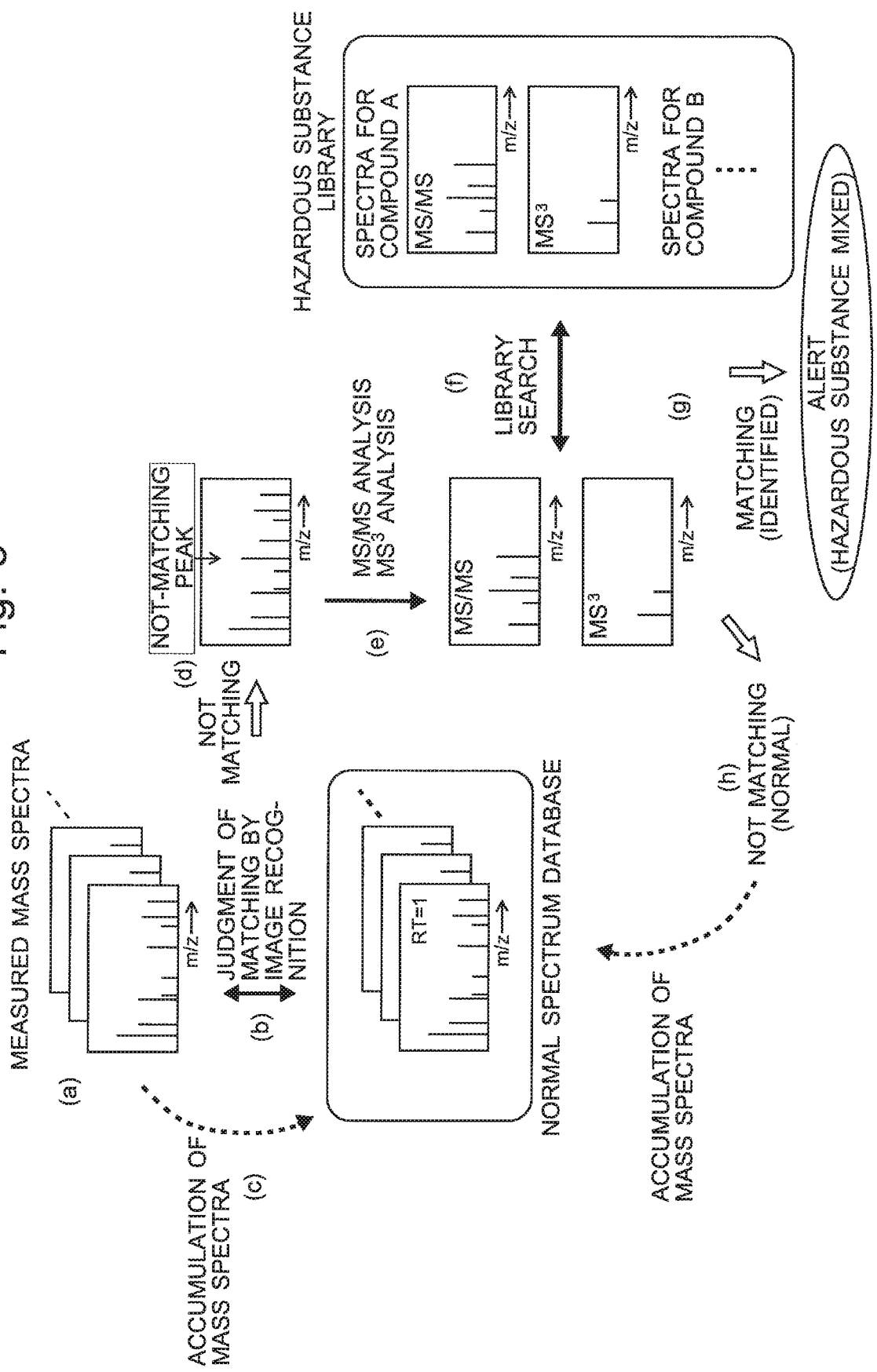
FIG. 3 is an illustration of a hazardous substance monitoring operation in the hazardous substance monitoring system according to the present embodiment.

A monitoring operation in the hazardous substance monitoring system according to the present embodiment is hereinafter described with reference to FIGS. 2 and 3 in addition to FIG. 1. FIG. 2 is a flowchart of a hazardous substance monitoring process in the hazardous substance monitoring system according to the present embodiment. FIG. 3 is an illustration of a hazardous substance monitoring operation.

In the hazardous substance library 48, standard $MS^2$ (MS/MS) spectra and $MS^3$ (MS/MS/MS) spectra for various compounds which, for example, are potentially harmful to human health and legally controlled are previously registered in association with compound information, such as the compound name, molecular formula and molecular weight. This hazardous substance library 48 may be created by users, although it should normally be provided by the manufacturer of the present device and will be updated as needed.

On the other hand, the normal spectrum database 44 is used to register a large number of mass spectra for samples in a normal condition in which no hazardous substance is contained, along with the retention-time information. Those mass spectra will be used for detecting an abnormal peak, as will be described later. For example, in the case of monitoring a river water, the normal condition for the water varies from one river to another. Even the same river may have different normal conditions depending on the location in the river. Accordingly, the normal spectrum database 44 should normally be prepared by accumulating a certain number of mass spectra by repeatedly performing a measurement for a sample introduced from a specified collection port 1a of a specified sample passage 1.

In the system according to the present embodiment, the various substances contained in a sample are detected in the MS unit 33 after being separated from each other by the LC unit 32. Therefore, by comparing mass spectra acquired at the same retention time, an abnormal peak which may appear at that retention time can be detected, provide that the data are acquired under the same separating condition in the LC unit 32. In other words, the separating condition in the LC unit 32 must be constantly maintained in all measurements, since a change in the separating condition makes it useless to compare mass spectra at the same retention time. Additionally, since it is normally impossible to predict the retention time at which an abnormal peak appears, it is basically necessary to register a mass spectrum for each of the retention times over the entire measurement time range in the normal spectrum database 44.

If such a registration method results in too many mass spectra to be registered in the database 44, it is possible to thin out the retention times at predetermined intervals of time and register fewer mass spectra in the normal spectrum database 44, rather than registering the mass spectra at all retention times within the entire measurement time range. As in the case where the specific substance (hazardous substance) to be detected is specified beforehand, if the retention time of the substance is predictable, it is possible to register a mass spectrum at that retention time or at each of the retention times within a narrow time range including that retention time in the normal spectrum database 44. The number of mass spectra to be registered will be considerably decreased by these methods. In the present example, it is assumed that the mass spectra are registered in the form of image data in a predetermined format which can be used for image recognition.

In order to monitor a hazardous substance, the control unit 5 controls the sample introduction unit 2 to regularly introduce a sample from the sample passage 1 at predetermined intervals of time (e.g. once every hour). Specifically, when a predetermined timing to collect the sample has come, the valve in the sample introduction unit 2 is opened for a predetermined period of time, whereby a portion of the river water flowing through the sample passage 1 is supplied through the valve to the autosampler 31. Thus, the sample to be subjected to the measurement is collected in the autosampler 31 (Step S1).

Next, the control unit 5 controls each section of the measurement unit 3 to perform an LC/MS analysis for the collected sample. That is to say, in the LC unit 32, various substances contained in the sample injected from the autosampler 31 under a specific separating condition as described earlier are temporally separated from each other. In the MS unit 33, a scan measurement over a predetermined range of mass-to-charge ratios m/z is repeatedly performed at predetermined intervals of time for the eluate containing the various substances separated by the LC unit 32. The data collector 41 collects mass spectrum data showing the relationship between the mass-to-charge ratio and signal intensity over the predetermined range of mass-to-charge ratios (Step S2). Peaks which originate from the substances contained in the eluate introduced into the MS unit 33 appear on this mass spectrum (see (a) in FIG. 3).

Every time a mass spectrum for the sample is acquired, or once every predetermined interval of time in the case where the normal spectrum database 44 holds one registered mass spectrum for each retention time at predetermined intervals of time, the spectrum matching judgment section 42 determines, by image recognition using artificial intelligence (AI), whether or not the spectrum pattern of the mass spectrum acquired by the measurement matches with that of a normal mass spectrum stored in the normal spectrum database 44, where the normal mass spectrum is either a normal mass spectrum having the same retention time as the acquired mass spectrum or one of the normal mass spectra included in a predetermined retention-time range which allows for a shift of the retention time (Step S3: see (b) in FIG. 3). It should be noted that the method for judging the matching in spectrum pattern is not specifically limited. For example, in place of the image recognition technique, a method similar to a common database search may be employed; i.e. the degree of similarity may be calculated according to a predetermined algorithm based on the degree of matching of the mass-to-charge-ratio values or that of the mass-to-charge-ratio values and signal intensity values (relative signal-intensity ratios between a plurality of peaks). In this case, the spectrum patterns can be judged to be matching with each other if the degree of similarity is equal to or higher than a predetermined threshold.

If the spectrum pattern of the measured mass spectrum matches with a spectrum pattern registered in the normal spectrum database 44, the measured mass spectrum is judged to be in the normal condition ("Yes" in Step S4), and the operation proceeds from Step S4 to Step S10. In this case, the measured mass spectrum is a mass spectrum which contains no hazardous substance. Therefore, the database updater 43 updates the normal spectrum database 44 so that the measured mass spectrum is added as one of the mass spectra in the normal condition (see (c) in FIG. 3). Thus, with an increase in the number of times of the measurement for the sample which contains no hazardous substance, i.e. with an increase in the period of time of the monitoring of the hazardous substance in the sample, the normal spectrum database 44 becomes increasingly enriched, which improves the accuracy of the judgment on the mass spectrum based on this normal spectrum database 44.

Subsequently, whether or not the LC/MS analysis for the sample collected in Step S1 has been completed is determined (Step S11). If the analysis is not completed, the operation returns to Step S2 to continue the LC/MS analysis.

For example, if there is a hazardous substance mixed in the sample due to some cause, a peak originating from that hazardous substance appears on the measured mass spectrum acquired at the timing (retention time) at which the hazardous substance is eluted in the column of the LC unit 32. This peak is one which should not be present in the mass spectrum at the same retention time registered in the normal spectrum database 44. Accordingly, their spectrum patterns do not match with each other in Steps S3 and S4, and the measured mass spectrum is judged to be in a non-normal condition ("No" in Step S4). In this case, the abnormal peak locator 45 extracts the peak which has prevented the matching of the spectrum pattern, i.e. the peak which is present in the measured mass spectrum but not in the corresponding mass spectrum registered in the normal spectrum database 44, as an abnormal peak and locates the mass-to-charge ratio of that peak as an abnormal mass-to-charge-ratio value (Step S5, see (d) in FIG. 3).

When an abnormal mass-to-charge-ratio value has been located, the MS$^n$ analysis execution commander 46 gives the control unit 5 a command to execute an MS/MS analysis and MS$^3$ analysis including a dissociating operation in which the located mass-to-charge-ratio value is selected as the target (i.e. as the precursor ion). Upon receiving this command, the control unit 5 controls the MS unit 33 so as to immediately execute an MS/MS analysis (product ion scan measurement) in which the located mass-to-charge-ratio value is selected as the precursor ion. Furthermore, the control unit 5 controls the MS unit 33 so as to subsequently execute an MS$^3$ analysis in which an ion corresponding to a predetermined peak, such as a peak having the highest signal intensity, observed on the MS/MS spectrum (product ion spectrum) acquired by the product ion scan measurement is selected as the target in the second dissociating operation. That is to say, when a substance which should not be detected in the normal condition, i.e. a substance which may possibly be a hazardous substance, has been detected, an MS/MS analysis and MS$^3$ analysis for that substance are immediately carried out to acquire an MS/MS spectrum and MS$^3$ spectrum (Step S6; see (e) in FIG. 3).

Subsequently, the identification processor 47 attempts to identify the aforementioned substance which may possibly be a hazardous substance by conducting a library search in which the MS/MS spectra and MS$^3$ spectra registered in the hazardous substance library 48 are checked for the acquired MS/MS spectrum and MS$^3$ spectrum, respectively (Step S7; see (f) in FIG. 3). In this step, only the substances registered beforehand in the hazardous substance library 48 need to be monitored; other substances are not the target of the monitoring and are allowed to be mixed in the sample. Therefore, if the substance has been successfully identified by the library search using the hazardous substance library 48 ("Yes" in Step S8; see (g) in FIG. 3), the alert commander 49 outputs an alert display notifying of the detection of a hazardous substance on the display unit 7, along with the compound name of the identified substance and other related information (Step S9). An alerting tone, such as a buzzer, may also be generated in addition to the display.

On the other hand, if the substance has not been identified by the library search using the hazardous substance library 48 ("No" in Step S8), it is possible to consider that the substance corresponding to the peak located as an abnormal peak in Step S5 is at least none of the hazardous substances being subject to control. Therefore, no alert is issued. Additionally, in this case, although the measured mass spectrum acquired without dissociation has been judged to be in a non-normal condition because no matching spectrum pattern was found in the normal spectrum database 44 at that point in time, the mass spectrum should be judged to be in the normal condition since it actually contains no hazardous substance. Accordingly, the operation proceeds to Step S10, and the database updater 43 updates the normal spectrum database 44 so that the measured mass spectrum is added to the database (see (h) in FIG. 3). In the subsequent processing, a mass spectrum including the aforementioned peak originating from the substance which has been judged to be none of the hazardous substances being subject to control will be judged to be in the normal condition in Steps S3 and S4.

After the passage of a predetermined length of measurement time for one injection of the sample into the LC unit 32, it is determined that the analysis has been completed ("Yes" in Step S11). The measurement unit 3 completes the LC/MS analysis and stands by until the next timing to collect the sample comes. By performing the sequential processing according to the flowchart shown in FIG. 2 at predetermined intervals of time, a hazardous substance contained in the water flowing through the sample passage 1 can be almost constantly detected. If a hazardous substance is contained in the sample, the system can promptly inform a monitoring operator of the compound name of the hazardous substance and other related information, allowing the operator to promptly identify the cause of the mixing of the hazardous substance and take measures against it.

In the processing shown in FIG. 2, when the mass spectrum has been judged to be in a non-normal condition in Step S4, an alerting operation may be performed, such as the display of a message for drawing attention of the monitoring operator. As noted earlier, even if a mass spectrum has been judged to be in a non-normal condition, the substance mixed in the sample may not be a hazardous substance. However, if an alert for drawing attention of the monitoring operator is issued at the point in time where the mass spectrum has been judged to be in a non-normal condition, it becomes possible to more promptly take measures in the case where a hazardous substance is actually mixed.

In the hazardous substance monitoring system according to the previous embodiment, the sample-collecting operation is automatically performed by the sample introduction unit 2 under the control of the control unit 5. The sample-collecting operation does not always need to be automatically performed; it may be performed according to a manual operation by the monitoring operator. It is also possible to allow the monitoring operator to irregularly issue a command to collect the sample and determine whether or not a hazardous substance is present, in addition to the automatic and regular operation of collecting the sample and determining whether or not a hazardous substance is present.

In the hazardous substance monitoring system according to the previous embodiment an LC-MS is used as the measurement unit 3. A single type of mass spectrometer may be used in place of the LC-MS in the case where the mixed compounds can be separated from each other by the mass separation by the MS unit 33, or more specifically, in the case where the compounds with different structures can be sufficiently distinguished by multi-stage dissociating operations or in the case where the mass accuracy or mass-resolving power is so high that even a slight difference in molecular weight can be recognized. In general, it is difficult to omit the LC unit if the mass spectrometry does not go beyond the MS/MS analysis. In the case where an $MS^n$ analysis with n being equal to or greater than three ($MS^3$, $MS^4$, $MS^5$ and so on) is performed, it is possible to omit the LC unit and yet detect a plurality of compounds in a sufficiently separated form. Needless to say, when the LC unit is not used, it is unnecessary to include the retention time in the information used for judging the degree of matching of the spectrum patterns of mass spectra.

In the hazardous substance monitoring system according to the previous embodiment, the $MS^n$ analysis is immediately performed when a peak which seems to have originated from a hazardous substance has been detected in a mass spectrum acquired through a normal mode of mass spectrometry in a sequential LC/MS analysis for one injection of the sample into the LC unit 32. Such a real-time execution of the $MS^n$ analysis is advantageous for promptly detecting a hazardous substance. However, it requires high-speed processing for the judgment of the matching of mass spectra or other operations. If it is difficult to perform the $MS^n$ analysis in real time, a second LC/MS analysis for the same sample may be performed after the completion of the LC/MS analysis for the first injection of the sample, and the $MS^n$ analysis may be performed in the second LC/MS analysis. In this case, the sample introduction unit 2 supplies the autosampler 31 with an amount of sample that is necessary for performing the LC/MS analysis multiple times. The autosampler 31 divides the sample into fractions and individually injects each fraction of the sample so as to perform the LC/MS analysis for the same sample multiple times.

The specific substance monitoring system according to the present invention is applicable not only in the monitoring of a liquid sample in the sample passage 1, as in the previous embodiment; the system is also applicable in the monitoring of a hazardous substance in a gaseous sample. In that case, a GC-MS is used as the measurement unit 3, or the MS unit may be solely used without the GC unit.

The sample to be monitored for whether or not a specific substance is contained is not limited to one collected through the sample introduction unit 2 having a valve. For example, the present invention can be used in a system which regularly or irregularly performs the sampling of various products manufactured in a factory to detect an impurity contained in the product. In this case, the specimen may be in a solid form. Such a specimen can be collected by an appropriate method, such as scraping a portion of the sampled product.

Thus, the present invention can be generally applied in various systems for monitoring the same kind of repeatedly supplied sample to determine whether or not a specific substance is contained in the sample, regardless of whether the monitoring is regularly or irregularly performed.

The previous embodiment as well as its variations described so far are mere examples of the present invention, and any modification, change, addition or the like appropriately made within the spirit of the present invention will evidently fall within the scope of claims of the present application.

REFERENCE SIGNS LIST

1 . . . Sample Passage
1a . . . Collection Port
2 . . . Sample Introduction Unit
3 . . . Measurement Unit
31 . . . Autosampler
32 . . . LC Unit
33 . . . MS Unit
4 . . . Data Processing Unit
41 . . . Data Collector
42 . . . Spectrum Matching Judgment Section
43 . . . Database Updater
44 . . . Normal Spectrum Database
45 . . . Abnormal Peak Locator
46 . . . $MS^n$ Analysis Execution Commander
47 . . . Identification Processor
48 . . . Hazardous Substance Library
49 . . . Alert Commander
5 . . . Control Unit
6 . . . Input Unit
7 . . . Display Unit

The invention claimed is:

1. A specific substance monitoring system that monitors a specific substance which is possibly contained in a sample, comprising:
   a mass spectrometer capable of an $MS^n$ analysis, where n is an integer equal to or greater than two;
   for a sample collector configured to repeatedly collect the sample at a predetermined timing; and
   a data processing unit including a processor and a non-transitory computer-readable-medium storing a computer program instruction,
   wherein the computer program instruction when executed by the processor:
   (i) performs a mass spectrometric analysis by the mass spectrometer for the sample collected by the sample collector, to acquire a mass spectrum for the sample;
   (ii) judges whether or not the acquired mass spectrum is in a normal condition, using a database created based on mass spectra acquired by performing a mass spectrometric analysis on each of a plurality of samples in the normal condition which are samples that do not contain the specific substance;
   (iii) locates, in a mass spectrum which is judged to be in a non-normal condition a peak which constitutes a cause of the judgment;
   (iv) performs an $MS^n$ analysis by the mass spectrometer for the sample collected with the sample collector, to acquire an $MS^n$ spectrum, where an ion corresponding to the located peak is selected as a target in the $MS^n$ analysis; and
   (v) attempts to identify a substance corresponding to the located peak by performing a library search using the acquired $MS^n$ spectrum, wherein:
   the computer program instruction when executed by the processor performs a library search using a hazardous substance library in which an $MS^n$ spectrum for a hazardous substance is registered beforehand, and issues an alert when a substance is identified by the library search.

2. The specific substance monitoring system according to claim 1, wherein:
the mass spectrometer is a liquid chromatograph mass spectrometer or a gas chromatograph mass spectrometer in which a liquid chromatograph or a gas chromatograph is connected in a previous stage of the mass spectrometer; and
the computer program instruction when executed by the processor determines whether or not a target mass spectrum is in the normal condition, based on a mass spectrum having a same retention time in the database or mass spectra included in a predetermined retention-time range which allows for a shift of the retention time.

3. The specific substance monitoring system according to claim 2, wherein:
the sample is a liquid sample, the mass spectrometer is a liquid chromatograph mass spectrometer, and the sample collector includes:
a sample container including a storage portion in which an inlet passage and an outlet passage for a liquid sample are provided, and a portion of a wall of the sample container is sealed with a septum;
a sample suction-ejection unit including a needle configured to suction and eject a liquid sample through the needle;
a sample injection port configured to inject a sample into a liquid chromatograph unit; and
a controller configured to control operations of the sample collector by driving the needle so as to make the needle move to a position at which the needle penetrates the septum of the sample container and suction a liquid sample contained in the storage portion of the sample container, and subsequently make the needle move to the sample injection port and eject the liquid sample into the sample injection port.

4. The specific substance monitoring system according to claim 3, wherein:
the sample collector further includes a preparative separation sample container configured to temporarily store a liquid sample;
the sample collector is capable of making the needle move between the position at which the needle penetrates the septum of the sample container, the sample injection port, and the preparative separation sample container; and
the controller controls operations of the sample collector and the sample suction-ejection unit so as to (i) make the needle move to the position at which the needle penetrates the septum of the sample container and suction a liquid sample contained in the storage portion of the sample container, and subsequently make the needle move to the preparative separation sample container and eject the liquid sample into the preparative separation sample container, as well as (ii) make the needle move to the preparative separation sample container and suction the liquid sample stored in the preparative separation sample container, and subsequently make the needle move to the sample injection port and eject the liquid sample into the sample injection port.

5. The specific substance monitoring system according to claim 1, wherein:
the sample collector automatically collects a sample at specified intervals of time or at specified points in time.

6. The specific substance monitoring system according to claim 1, wherein:
the computer program instruction when executed by the processor operates the mass spectrometer to perform an $MS^n$ analysis and an $MS^3$ analysis for a sample collected with the sample collector, and acquire an $MS^2$ spectrum and an $MS^3$ spectrum, and
the computer program instruction when executed by the processor attempts to identify a substance by performing a library search using the acquired $MS^2$ spectrum and the acquired $MS^3$ spectrum.

7. The specific substance monitoring system according to claim 1, wherein:
the computer program instruction when executed by the processor updates information in the database using a mass spectrum judged to be in the normal condition.

8. The specific substance monitoring system according to claim 7, wherein:
if the substance is not successfully identified, the computer program instruction when executed by the processor updates the database so that the mass spectrum on which a peak originating from the unidentified substance is observed is registered as a mass spectrum in the normal condition.

9. A specific substance monitoring system that monitors a specific substance which is possibly contained in a sample, comprising:
a mass spectrometer capable of an $MS^n$ analysis, where n is an integer equal to or greater than two;
a sample collector configured to repeatedly collect the sample at a predetermined timing; and
a data processing unit including a processor and a non-transitory computer-readable-medium storing a computer program instruction,
wherein the computer program instruction when executed by the processor:
(i) performs a mass spectrometric analysis by the mass spectrometer for the sample collected by the sample collector, to acquire a mass spectrum for the sample;
(ii) judges whether or not the acquired mass spectrum is in a normal condition, using a database created based on mass spectra acquired by performing a mass spectrometric analysis on each of a plurality of samples in the normal condition which are samples that do not contain the specific substance;
(iii) locates, in a mass spectrum which is judged to be in a non-normal condition a peak which constitutes a cause of the judgment;
(iv) performs an $MS^n$ analysis by the mass spectrometer for the sample collected with the sample collector, to acquire an $MS^n$ spectrum, where an ion corresponding to the located peak is selected as a target in the $MS^n$ analysis; and
(v) attempts to identify a substance corresponding to the located peak by performing a library search using the acquired $MS^n$ spectrum, wherein:
the computer program instruction when executed by the processor judges the matching of a pattern of mass spectra by using an image recognition technique employing artificial intelligence, and determines whether or not the target mass spectrum is in the normal condition.

* * * * *